Figure 1:
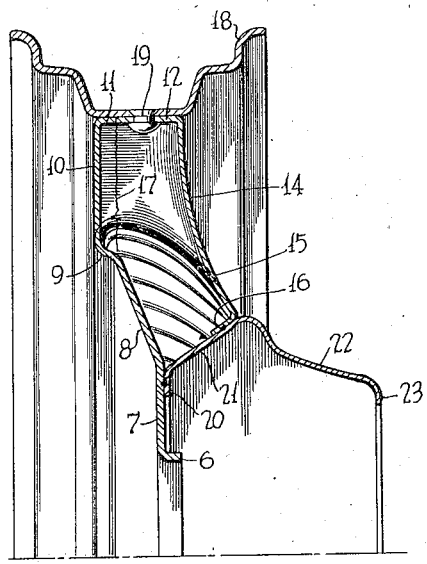

June 30, 1936.    C. L. EKSERGIAN    2,045,901
VEHICLE WHEEL
Filed May 8, 1934

INVENTOR.
Carolus L. Eksergian.
BY John P. Tarbox
ATTORNEY.

Patented June 30, 1936

2,045,901

UNITED STATES PATENT OFFICE 2,045,901

VEHICLE WHEEL

Carolus L. Eksergian, Detroit, Mich., assignor to Budd Wheel Company, Philadelphia, Pa., a corporation of Pennsylvania Application May 8, 1934, Serial No. 724,475

8 Claims. (Cl. 301—64)

This invention relates to vehicle wheels and particularly to pressed sheet metal wheels of the artillery type.

Among the objects of the invention are to reduce the number of parts, coordinate the elements to provide improved bracing effects, adequately seal a hollow section wheel part against the admission of foreign matter, and to form and combine the load sustaining, sealing and bracing members in new and effective shapes and relations.

Other objects include reducing the weight, consistent with adequate strength, preventing deleterious service effects, facilitating fabrication, assembly, welding, installation and manipulation, reducing the cost and simplifying the shapes of dies employed in manufacture, and effectively drawing the metal in the dies.

A further object is to provide a device of the above-indicated character that shall be simple and durable in construction, economical to manufacture, and effective in its operation.

In wheels of the hollow section sheet metal type, various forms and modes of assembly and welding may be employed for various reasons, such as the loads to be sustained, the types of vehicles to be supported, the number, size, shape and spacing of appurtenant parts, with which the wheels are associated, and other factors; certain conditions requiring wheels of one kind and distribution of parts and other conditions requiring others.

In the instant case, a sheet metal wheel, or its equivalent, is preferably constructed of only three unit stampings, which when cooperatively assembled and secured together, outline a wheel defined by a radially inner bolting-on flange, or similar supporting annulus, and a hollow section body preferably disposed substantially entirely radially outwardly of the flange; this body having front and rear walls spaced substantial axial distances adjacent to the flange and including, as a major feature of the invention, an annulus preferably of single layer thickness constituted at once, both as an axial brace for the walls and as a closure for the hollow section body. This annulus may also be constituted as a hub shell or hub cap support, and be variously formed as a separate entity, or as a part of one of the other stampings, as will herein appear.

In a preferred form, a rear part defines axially outwardly, in succession from the bolting-on flange, a cone body diverging rearwardly from the flange and having front-opening shallow-channel spoke portions closed at the outer ends. A front element similarly defines an annular seat, either radially inwardly from, or as part of the nave inwardly from the spokes, a conical nave, and rear-opening deep channel spoke portions cooperating with the rear spoke portions to form composite tubular spokes.

The combined brace and closure annulus comprises a rear margin or angle section disposed in side-surface or nesting relation to the rear member, preferably on, or adjacent to, the radially outer perimeter of the bolting-on flange and spot welded thereto. This annulus projects axially forwardly as a cone or cylinder into side-surface or nesting relation to the front element to better distribute the load forces and to facilitate spot welding, and, as above indicated, may be a separate entity, an integral element of one of the other stampings, extend forwardly of the front body member, and be variously constituted, as will be more apparent from a consideration of the following description and accompanying drawing, in which Fig. 1 is an axial section, through the center of a spoke, of a portion of a wheel embodying the invention, and Figs. 2, 3, 4 and 5 are views similar to Fig. 1, of modified forms thereof; corresponding parts in all of the figures being designated by corresponding reference characters.

Referring to Fig. 1, a sheet-metal rear spider stamping, preferably of heavy gauge and of radially-outwardly-tapering thickness, includes a radially-inner short axial flange 6, a radial bolting-on flange 7, a conical body 8 diverging rearwardly from the outer perimeter of the flange 7 and a reverse-curve section 9 on the body 8 merging into spoke portions 10 of front-opening shallow channel section closed at the outer ends by elements 11.

A front spider stamping comprises outer-end spoke closures 12, rear-opening deep-channel spokes 14, and a conical nave 15 having an inturned flange margin or seat 16 radially inwardly of the spokes. The front and rear spiders are preferably joined with the spoke portions 10 and 14, and the end closures 11 and 12, in abutting edge flash welded relation, as indicated by a line 17. The composite end closure, thus formed, is suitably joined as by rivets 19, to a rim 18, shown as of a standard drop-center type.

A radially-inner annulus includes a rear-end margin or angle section 20 disposed in side-surface preferably spot-welded relation to the rear spider adjacent to the outer perimeter of the bolting-on flange 7, and extends, as a forwardly-diverging cone 21 into side-surface or nesting relation to the seat 16, to which it is preferably spot welded. The cone 21 merges, through a curved section, into a forwardly-projecting hub shell 22 symmetrically continuing the front-side contour of the front spider and having a front inner radial flange 23.

Figure 2:
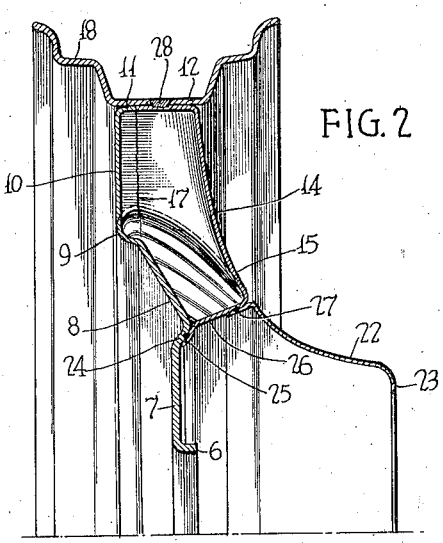

In Fig. 2, the rear spider stamping has a reverse-curve section 24 forming a nesting seat for a similarly curved flange 25 on an extension 26 of the front spider and taking the place of the brace section 21 of Fig. 1. The hub shell 22 has a flange 27 preferably spot welded in nesting within side-surface engagement with the extension brace portion 26. Also, in Fig. 2, alternate securing means, for the units 19 between the spoke end closures and the rim, are in the form of weld plugs 28; other securing means further being contemplated.

Figures 3, 4:
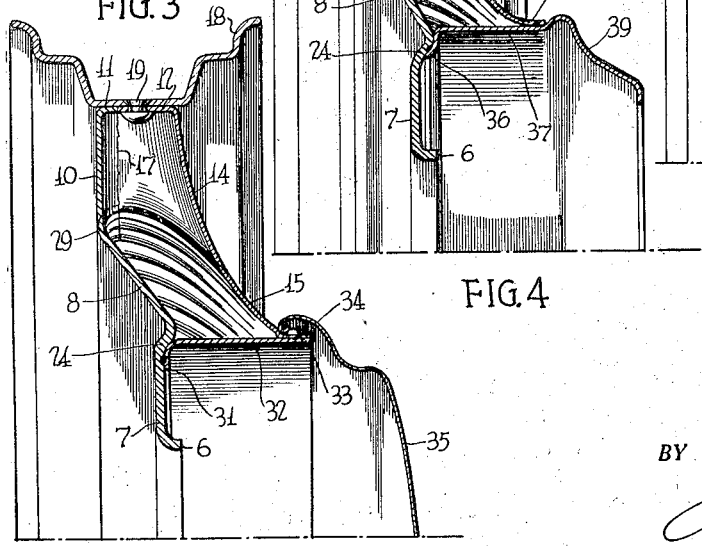

In Fig. 3, the reverse-curve section 9 is replaced by a simple curve section 29, and a reverse-curve section 24 provided between the cone body 8 and the flange 7 constituting a nesting seat for a radial flange 31 on an annular brace 32 having a front margin 33 nesting a seat 34 on the nave 15, thus rendering the intersecting or nesting portions of reinforced laminated section carrying buttons or other means for the reception of hub cap 35.

In Fig. 4, the front and rear spiders are similar to those of Fig. 3, but the cross-brace closure annulus comprises a reverse-curve section 36 nesting the section 24, and a cylindrical axial section 37 nesting a radially-inner annulus 38 of the nave 15, to which it is spot welded and from which it extends forwardly in the form of an ornamented hub shell or hub cap support 39.

Figure 5:
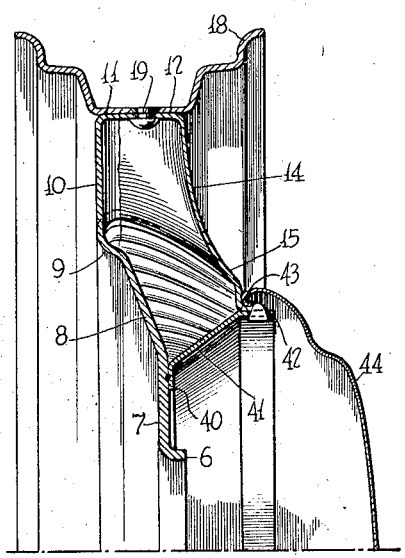

In Fig. 5, the rear spider is similar to that of Fig. 1, for cooperation, near the radially-outer perimeter of the flange 7, with a flange 40 on a cone brace 41 having a front seat 42 nesting an angle-section seat 43 on the nave 15, which supports a hub cap 44.

The parts may, of course, be variously otherwise arranged, such as having the brace a part of the flange 7 or of the rear spider, or of the front spider and the bolting-on flange; such features being deemed apparent from, and equivalent to, the structures shown and as unnecessary or redundant for illustration.

While by way of illustration and example I have described my invention in connection with preferred embodiments thereof as to structure, and the preferred manner of practicing it, it will be obvious to those skilled in the art, after understanding the foregoing, that various changes and modifications may be made without departing from the spirit or scope of the appended claims to cover all such modifications and changes.

What I claim is:

1. An artillery steel wheel comprising a taper gauge one-piece rear spider stamping having radially outwardly successively, an axial flange, a bolting-on flange, a rearwardly diverging cone and front opening shallow channel spoke portions closed at the outer ends, a one-piece lighter-gauge front spider stamping element including rear opening spoke portions of deep channel section closed at the outer end secured to and cooperating with the rear spider spoke portions to form closed end tubular composite spokes and embodying a conical nave having an annular generally axially extending seat radially inwardly of the spokes, and an annular one-piece sheet metal element of lighter-gauge than the rear spider including a cooperating seat nesting within said front spider seat, one of said elements also including an annular rearward extension having a substantially radial rear end flange secured in side surface engagement with the radially outer margin of said bolting-on flange.

2. An artillery steel wheel comprising a rear spider stamping having extending radially outwardly successively, a bolting-on flange, a rearwardly diverging cone and front opening channel spoke portions, a front spider stamping element including rear opening spoke portions of channel section secured to and cooperating with the rear spider spoke portions to form tubular composite spokes and embodying a conical nave having an annular generally axially extending seat radially inwardly of the spokes, and an annular hollow section element including a cooperating seat nesting within said front spider seat, one of said elements also including an annular rearward extension having a rear end margin secured in side surface engagement with the rear spider adjacent to the outer perimeter of the bolting-on flange.

3. An artillery steel wheel comprising a rear spider having extending radially outwardly successively, a bolting-on flange, a rearwardly diverging cone and spoke portions, a front spider element including hollow spoke portions marginally secured to and cooperating with said rear spider spoke portions to form hollow composite spokes and embodying a nave having an annular generally axially extending seat radially inwardly of the spokes, and an annular hollow section element including a cooperating seat nesting within said front spider seat, one of said elements also including an annular rearward extension having a rear end margin secured in side surface engagement with the rear spider adjacent to the outer perimeter of the bolting-on flange.

4. An artillery steel wheel comprising three one-piece sheet metal members cooperatively assembled and secured together in a structure defined by a radially inner bolting-on flange and a hollow body outwardly of said flange including a rear wall extension of said flange of conical section diverging rearwardly from the flange and having spoke portions, an annulus secured to and projecting forwardly from adjacent to the radially outer limits of the flange, and a front element including hollow spoke portions secured to and cooperating with said first spoke portions to form hollow composite spokes, and a conical nave having a generally axially extending portion radially inwardly of the spokes overlapping and joining a portion of said forwardly projecting annulus at a position spaced a substantial axial distance from the flange.

5. A vehicle wheel comprising three one-piece sheet metal members cooperatively assembled and secured together in a structure defined by a radially inner bolting-on flange and a hollow body outwardly of said flange including a rear body wall extension of said flange of conical section diverging rearwardly from the flange, an annulus secured to and projecting forwardly from adjacent to the radially outer limits of the flange, and a front body element having a generally axially extending annular portion overlapped with and joined to a portion of said forwardly projecting annulus at a position spaced a substantial axial distance from the flange.

6. An artillery steel wheel comprising a rear spider stamping including a bolting-on flange, a conical body diverging rearwardly from the outer perimeter of the flange and spoke portions on the body, an annulus secured to and projecting forwardly from the rear spider adjacent to the outer perimeter of the flange, and a front spider stamping including spokes of rear opening channel section secured to and cooperating with said rear spider spoke portions to form composite spokes of tubular section and a nave having an annular axially extending margin radially inwardly of the spokes in which said annulus nests at an axially intermediate position substantially offset from the annulus ends, the outer portion of said annulus comforming generally to the contour of the front spider.

7. An artillery steel wheel comprising a rear spider stamping including a bolting-on flange, a conical body diverging rearwardly from the outer perimeter of the flange and spoke portions on the body, and a front spider stamping including spoke portions of rear opening channel section secured to and cooperating with said rear spider spoke portions to form tubular spokes and a conical nave having an annular reversely conical portion extending radially inwardly of the spokes and extending rearwardly to, and nesting, with the rear spider adjacent to said outer perimeter and secured thereto, said portion terminating outwardly of the bolting-on flange.

8. An artillery steel wheel comprising a rear spider stamping including a bolting-on flange, a conical body diverging rearwardly from the outer perimeter of the flange and spoke portions on the body, a front spider stamping including spoke portions of rear opening channel section secured to and cooperating with said rear spider spoke portions to form tubular composite spokes and a nave having a front hub cap mounting flange, and an annulus having a rear end margin nesting with and secured to the rear spider adjacent to said flange perimeter and a front end margin nesting within and secured to said hub cap mounting flange.

CAROLUS L. EKSERGIAN.